Feb. 16, 1971   J. GREENBERG   3,564,361
STACKED CAPACITOR
Filed June 30, 1969
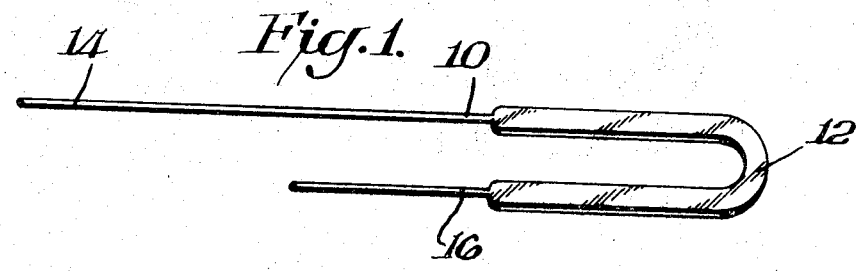
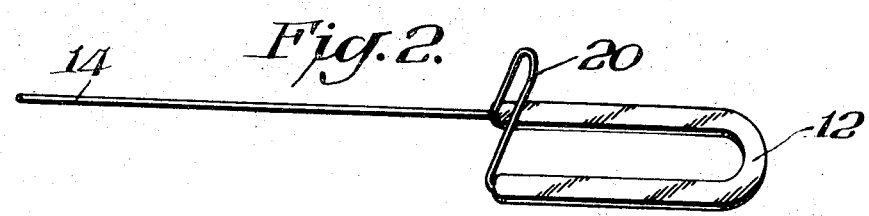
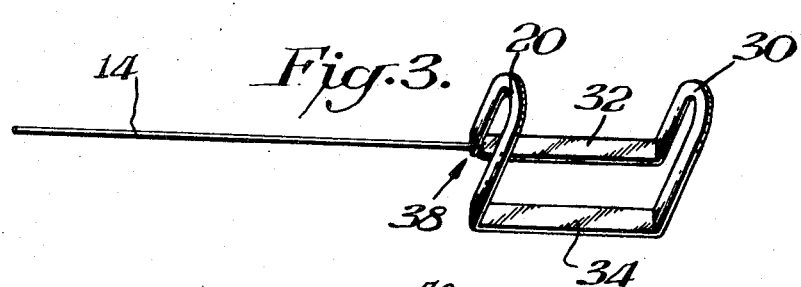
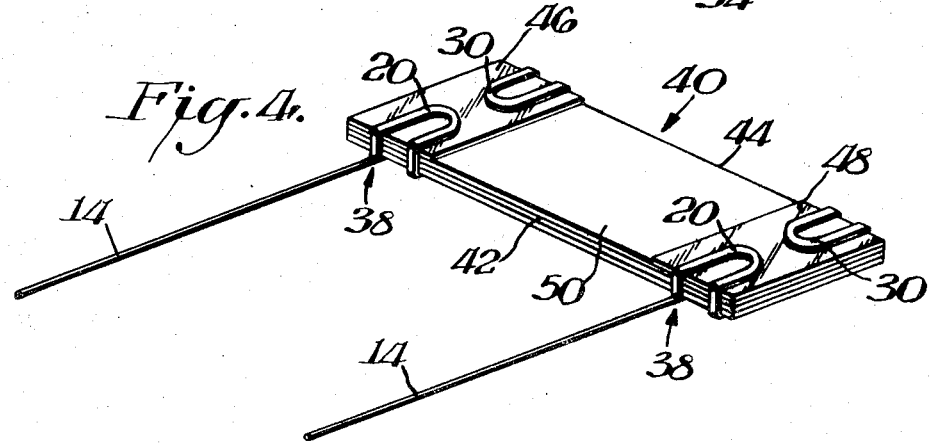

United States Patent Office 3,564,361
Patented Feb. 16, 1971

3,564,361
STACKED CAPACITOR
Jack Greenberg, Whitefish Bay, Wis., assignor to Sprague Electric Company, North Adams, Mass., a corporation of Massachusetts
Filed June 30, 1969, Ser. No. 837,552
Int. Cl. H01g 1/14
U.S. Cl. 317—261                          6 Claims

ABSTRACT OF THE DISCLOSURE

An integral wireform provides a folded portion in clamping engagement with a stacked capacitor and an end portion which extends from the component as a radial leadwire, and said folded portion is arranged such that radial pull on the leadwire has substantially no unfolding action on the clamping portion.

BACKGROUND OF THE INVENTION

This invention relates to a stacked capacitor and more particularly to a stacked capacitor having an integral clamp and leadwire.

It is known in the prior art to provide stacked capacitors with integral clamp and leadwire assemblies. However, prior art structures generally provide inadequate clamping on a single edge of the stack and often provide clamping arrangements such that lead pull tends to unfold the wireform and disturb its clamping engagement.

It is an object of this invention to provide a stacked capacitor having an integral clamp and leadwire arrangement.

It is another object of this invention to provide an integral clamp and leadwire arrangement in which pull on the leadwire portion has substantially no unfolding action on clamping portions of the wireform.

It is a further object of this invention to provide a stacked capacitor having a clamp and leadwire arrangement wherein the leadwire portion extends along the stack face and folds around the furthermost edge of the capacitor such that lead pull is substantially directed against this edge rather than against the clamping wire portion.

These and other objects of the invention will be apparent upon consideration of the following specification of claims taken in conjunction with the drawing.

SUMMARY OF THE INVENTION

Broadly, a stacked capacitor provided in accordance with the invention comprises a plurality of alternate layers of conductive electrode and dielectric material disposed in a stacked arrangement with conductive means for extending alternate electrodes to separate surface portions of said stack, at least one integral wireform having a folded portion and an end portion, said folded portion in clamping engagement with at least one edge of said stack, and said end portion extending from said folded portion across a major surface of said stack and from the opposite edge thereof to provide a radial leadwire wherein axial pull on said leadwire portion has substantially no unfolding action on the clamping portion.

BRIEF DESCRIPTION OF THE DRAWING

FIG. 1 is a view in perspective of a wireform showing a first step in the formation of a wireform provided in accordance with the invention;

FIG. 2 is a view in perspective showing a second step in construction of the wireform;

FIG. 3 is a view in perspective illustrating a further step in construction of the wireform; and FIG. 4 is a view in perspective of the completed capacitor utilizing a pair of wireforms produced in accordance with the steps shown in FIGS. 1–3.

DESCRIPTION OF THE PREFERRED EMBODIMENT

In a first step in construction of the preferred wireform, a wire 10 of nickel plated or tinned copper or the like is bent into a U-shaped arrangement 12 such that a first leg 14 is extended beyond a second leg 16 as shown in FIG. 1. Part of the U-shaped portion 12 is flattened in the plane of the U-shape by pressing or the like. The actual length of the folded legs and of their flattened portions are dependent on the geometry of the particular stacked capacitor as will be evident from the following description.

The wire of FIG. 1, is then further folded as shown in FIG. 2. Herein the unflattened leg portion 16 is folded upright and formed into a second U-shape portion 20 which extends to the vicinity of the leg 14. Thereafter as shown in FIG. 3, upright portion 20 is flattened in the plane of its U-shape as shown, and the first U-shaped portion 12 is also folded into an upright position, to provide an intermediate portion 30.

This then provides an integral wireform 38 having one end extended as leadwire 14 and upright portions 20, 30 joined by spacing members or legs 32 and 34. The first spacing member 32 extends wire 14 from the vicinity of upright 20 to upright or intermediate portion 30. While the second spacing member 34, which is substantially parallel to first member 32, joins intermediate portion 30 to end portion 20 which makes up the other end of the wireform.

A pair of wireforms are assembled to a stack capacitor as shown in FIG. 4. The wireforms are disposed in parallel at opposite ends of a stacked capacitor 40 with each folded around capacitor 40 in clamping engagement with it and in contact with a respective conductive foil thereof. This is accomplished by positioning capacitor 40 on the spacing legs 32, 34 and thereafter forming U-shaped portions 20 and 30 around opposing edges of the stack, for example, around edges 42, 44. Connection to the capacitor electrodes is provided in this case on upper surface 50 by contact between clamping portions 20, 30 of the wireform and the extended foils 46 and 48 which are of opposite polarity. Advantageously, the U-shaped portions and the extended legs provide a clamping force over an extended surface area of the stack.

Any conventional stacked capacitor such as a Mica capacitor or the like may be utilized in the invention. For example, a stacked capacitor having layers of silver coated Mica is suitable. Conductive means, such as metal foil of tin or the like are provided in contact with alternate silver electrodes and extended to separate surface portions of the capacitor. For example, foils 46, 48 of FIG. 4 are extended to opposite ends of the upper major surface 50 of capacitor 40. Alternatively, foils 46, 48 could also be brought to the lower surface 52 (not shown) for contact with the underlying spacer portions 32, 34 of the wireforms. Moreover, the foils may be extended to lateral edges 42, 44 in the vicinity of the uprights of each wireforms so as to make contact at this point. The stack is completed by bonding the layers together in a conventional manner, as for example, by coating layer portions with varnish or the like and applying heat and pressure to the stack before clamping.

Wireform 38 is assembled to the capacitor as shown in FIG. 4 with one wireform in contact with each of the surface foils of the capacitor. Upright portions 20 and 30 are folded towards each other and down against the upper major surface 50 of the stack so as to entrap the opposing edges 42, 44 and to provide clamping portions 20, 30 of wireforms in contact with the conductive foils 46 and 48 at either end of stack 40.

Advantageously, radial pull on the leadwire 14 has no unfolding action on the clamping portions since leadwire 14 is essentially axially extended (through spacing leg 32) along the lower surface of the stack to the intermediate portion 30 which clamps around the opposing edge of the capacitor. Hence lead pull is essentially exerted against opposing edge 44 and does not exert an unfolding force on intermediate portion 30.

Many different variations in the wireform are possible of course. Some or all of the folded sections may be flattened or not as desired, and the U-shaped portions may assume various curvatures. For example, rather than the arcuate curve shown in the figures, U-shaped portions 20 and 30 may actually be rectangular shaped as formed with right angle bends or the like.

Preferably, leadwire 14 should extend substantially normal to or radially from the clamped edges. In all cases it is important that leadwire 14 extend from one clamped edge across a major surface of the stack and beyond the opposite edge to provide a radially extended leadwire.

Generally, the wireforms are designed for use with substantially thin planar structures having a rectangular perimeter, however, various stack thicknesses and shapes may be accommodated.

It is also to be understood that end portion 20, which is folded around edge 42, could in some instances be terminated on the major surface 50 rather than be extended back to lead 14, as shown. In this case, of course, the clamping engagement of the wireform would not be balanced on both edges, as is preferred. Moreover, end portion 20 could of course, be extended beneath or folded around lead 14 to provide additional support and resistance to unfolding due to pull of the leadwire.

Many different types of stacked capacitors can be utilized; however, in each case, a contact area must be provided on one of the surfaces of the capacitor adjacent the position of the clamping wireform. Thus it should be understood that many different embodiments are possible without departing from the spirit and scope of the invention, and that the invention is not to be limited except as in the appended claims.

What is claimed is:

1. A stacked capacitor comprising a plurality of alternate layers of electrodes and dielectric materials disposed in a stacked arrangement with a pair of conductive means for extending alternate electrodes to spaced apart surface portions of said stack, at least one integral wireform having a folded portion disposed in clamping engagement with at least one edge of said stack and in contact with one of said conductive means, said wireform having an end portion extending from said folded portion normal to said edge and completely across a major surface of said stack and from said stack providing an aligned leadwire portion, said wireform constructed and arranged such that radial pull on said leadwire portion has substantially no unfolding action on the folded portion.

2. The capacitor of claim 1 wherein said folded portion includes a U-shaped intermediate portion which is clamped around said one edge of said stack, and one leg of said intermediate portion is extended across said major surface and from said stack to provide said leadwire.

3. The capacitor of claim 2 wherein said folded portion includes another end portion clamped around the opposite edge of said stack, a second leg of said intermediate portion extending across said major surface in substantially parallel relation to said first leg, and said second leg portion joining said intermediate portion to said other end portion.

4. The capacitor of claim 3 wherein both said intermediate portion and said other end portion are U-shaped portions folded around opposite edges of said stack, and said leg portions are extended across said major surface adjacent to and in parallel one of the stack edges adjoining said clamped edges.

5. The capacitor of claim 3 wherein said folded portion is flattened in the plane of said spacing legs.

6. The capacitor of claim 3 wherein said leadwire is axially extended from its spacing leg.

References Cited

FOREIGN PATENTS

| | | | |
|---|---|---|---|
| 612,828 | 4/1935 | Germany | 317—261 |
| 410,768 | 4/1934 | Great Britain | 317—261 |

E. A. GOLDBERG, Primary Examiner